Feb. 26, 1963
R. F. ZITKO
3,078,681
SEED TAPE PLANTER
Filed March 26, 1959
2 Sheets-Sheet 1
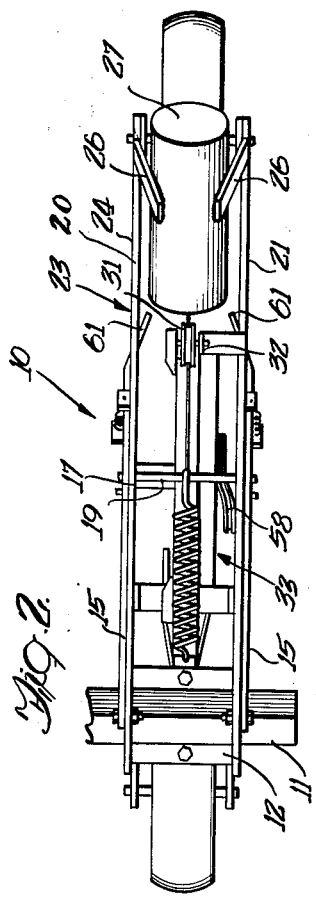
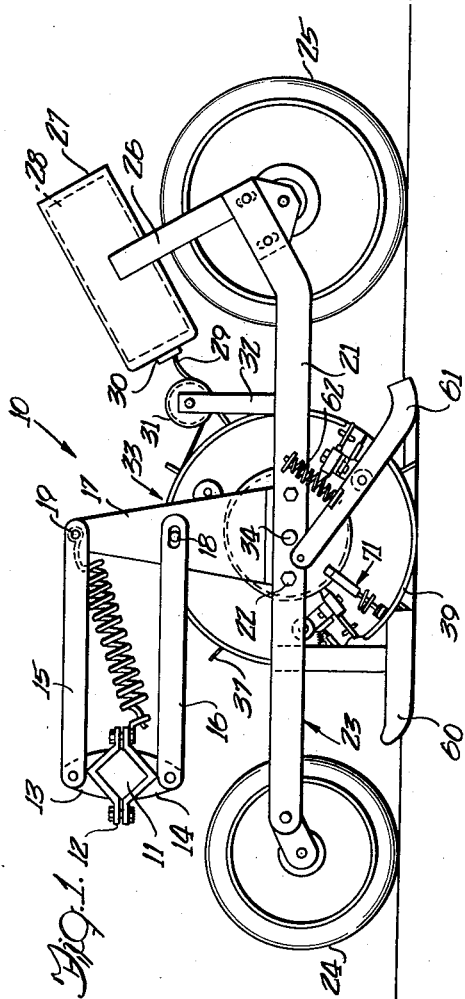
INVENTOR
RONALD F. ZITKO
Paul O. Pippel
ATTORNEY

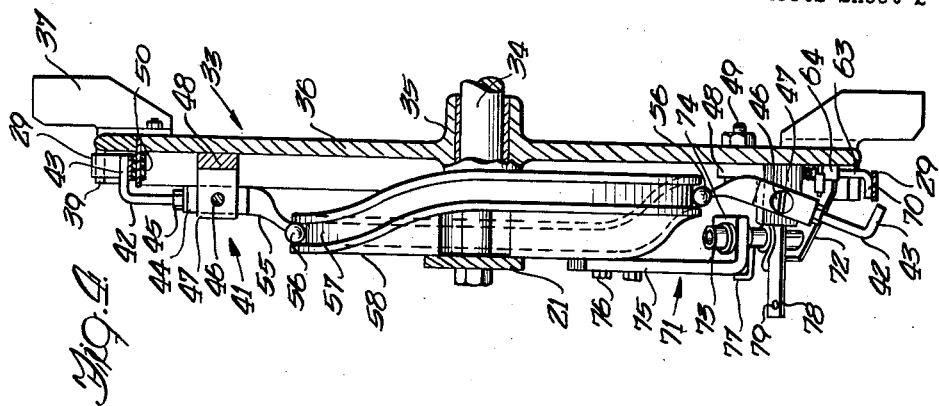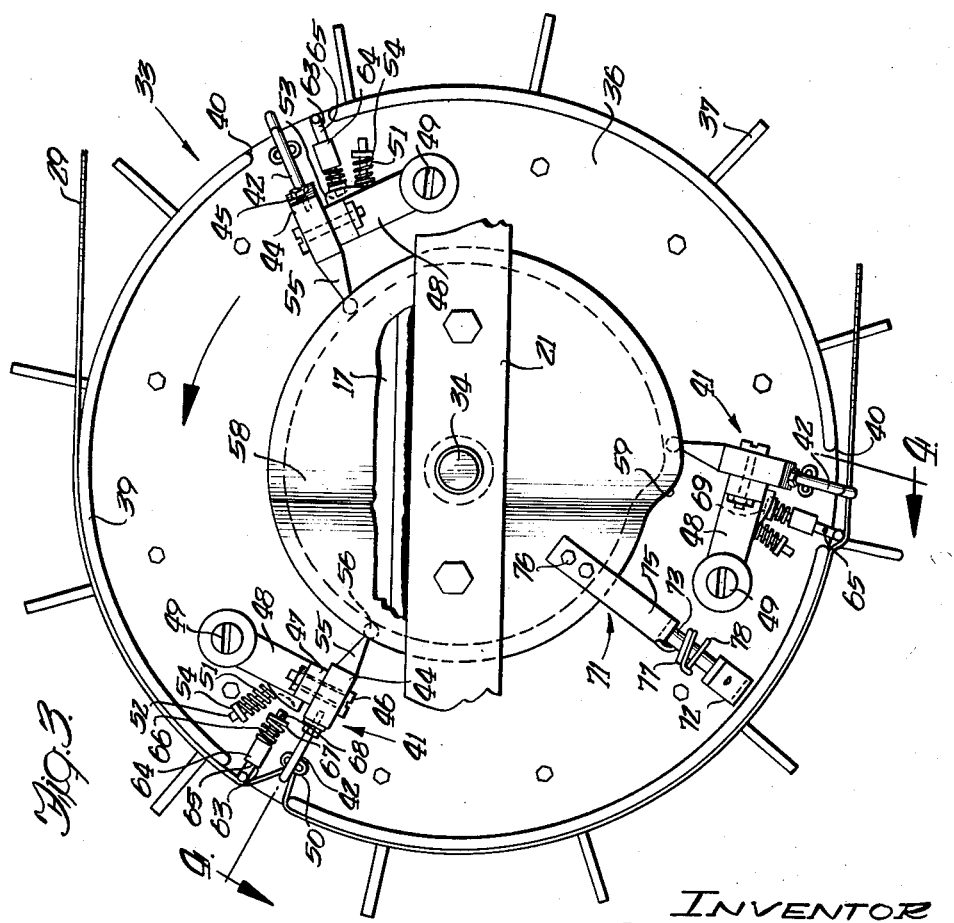

United States Patent Office 3,078,681
Patented Feb. 26, 1963

3,078,681
SEED TAPE PLANTER
Ronald F. Zitko, Cicero, Ill., assignor to International Harvester Company, Chicago, Ill., a corporation of New Jersey
Filed Mar. 26, 1959, Ser. No. 802,151
4 Claims. (Cl. 61—72.6)

This invention relates to agricultural implements and particularly to planters. More specifically, the invention concerns an improved planter for seed tape or the like.

In the planting of seed tape, the tape, preferably of a water soluble material, is usually laid on the ground or in a furrow and covered with a thin layer of dirt. Due to the lightness of the tape it is frequently caught by the wind before it can be covered, and is disarranged, and an object of this invention is the provision of an improved seed tape planter wherein novel means are provided for anchoring the tape to the ground as soon as it is deposited.

Another object of the invention is the provision in a seed tape planter of an improved feed wheel construction incorporating means for grasping and holding the tape as it is fed thereto, and in combination therewith, means for anchoring the tape to the ground as it leaves the feed wheel to be deposited.

A further object of the invention is the provision, in a seed tape planter feed wheel having means for releasably clamping the tape to the periphery of the wheel as it is fed thereto, of improved means for actuating the clamping means to seize and hold the tape and to release it after a predetermined rotation of the wheel.

Another object of the invention is the provision, in a seed tape planter feed wheel having means for releasably clamping the tape to the periphery of the wheel as it is fed thereto, of means actuated by the clamping means for striking the tape as it leaves the wheel and staking it to the ground.

Other objects and advantages of the invention will become clear from the following detailed description when read in conjunction with the accompanying drawings wherein:

FIG. 1 is a view in side elevation of a planter unit incorporating the features of this invention mounted upon a transversely extending tool bar;

FIG. 2 is a plan view of the structure shown in FIG. 1;

FIG. 3 is an enlarged detail of the tape feeding wheel of this invention showing the mechanism for grasping and staking the tape; and FIG. 4 is a section taken approximately on the line 4—4 of FIG. 3.

In the drawings the numeral 10 designates a one-row planter unit mounted on a transversely extending tool bar 11 adapted to be carried by a tractor or the like. Only one planter unit is shown, although it may be understood that for multiple row planting a plurality of planting units 10 may be mounted at laterally spaced locations on the tool bar. The planter unit is mounted on the tool bar through the intermediary of a clamp 12 having a laterally spaced pair of upstanding and depending ears 13 and 14, respectively, and to these ears are pivotally connected the forward ends of laterally and vertically spaced pairs of parallel links 15 and 16 respectively. The rear ends of links 15 and 16 are pivotally connected to a pair of standards 17 by separate lower pivot pins 18 and a single transverse pin 19 extends between the standards.

The planter unit includes laterally spaced longitudinally extending frame bars 20 and 21 to which the lower ends of standards 17 are affixed. The bars 20 and 21 form parts of a supporting frame 23 carrying a wheel 24 at its forward end and another wheel 25 at its rear end.

A pair of straps 26 secured to the rear ends of bars 20 and 21, extend upwardly therefrom and are affixed to a cylindrical container 27 in which is received a spool 28 of a continuous ribbon or tape of cellulosic or other suitable material 29 in which seed and the like is embedded. The tape 29 is withdrawn from the interior of spool 28 through an outlet 30 in the container 27, and is led around an idler roller 31 mounted upon a bracket 32 affixed to the side rail 21 of the frame.

The seed tape 29 passes under roller 31 and over the periphery of a feed wheel 33 rotatably mounted upon a transverse shaft 34 extending between frame bars 20 and 21.

Feed wheel 33 comprises a hub 35 receiving shaft 34, and a solid disk main body portion 36, to the outer face of which, adjacent the periphery thereof, are secured at circumferentially spaced locations a plurality of ground-engaging lugs 37.

Wheel 33 has a rim in the form of a flange 39 projecting inwardly from the periphery of disk portion 36 and having three circumferential openings 40 therein. Tape 29 led from receptacle 27 to wheel 33 engages the outer surface of rim 39 and is seized or grasped by a clamping apparatus designated at 41 comprising a finger 42 the upper end of which is bent to form a hook 43. Finger 42 is threaded for reception in a block 44 and held in place by a nut 45.

Clamping apparatus 41 is reciprocated generally radially of the wheel 33 and parallel to the main body portion 36 thereof. For this purpose block 44 is pivotally mounted upon a bolt 46 carried by the outwardly bent flange 47 of an arm 48 pivotally mounted upon a bolt 49 carried by the wheel. By swinging arm 48, each of the fingers 42 is reciprocatable through its associated opening 40 in rim 39 of the wheel from a fully extended position, such as shown at the bottom of the wheel, to the fully retracted position shown at the left of the wheel in FIG. 3.

In the retracted position of the clamping structure 41, finger 42 has pulled the tape 29 inwardly so that the hook portion 43 presses it against a rubber covered stop member 50 secured to the wheel radially inwardly of the rim 39. Clamping member 41 is biased inwardly to the retracted position by a coil spring 51 surrounding a pin 52 affixed to a projection 53 on arm 48 and slidable in a collar 54 secured to the disk portion 36 of the wheel.

Reciprocation of the clamping member 41 from the retracted to the extended position of FIGS. 3 and 4, is accomplished by the provision of an axially inwardly bent extension 55 of block 44, terminating in a ball 56 adapted to be confined in a channel-shaped track 57 in the periphery of an eccentric member 58 bolted to frame bar 21.

As the feed wheel 33 revolves in the direction of the arrow shown in FIG. 3, the tape is firmly held against stop member 50 and therefore secured to the periphery of the wheel until it nears the ground when it releases the tape so that it can be deposited. Member 58 is generally concentrically mounted on shaft 34, and as clamping member 41 travels in the retracted position with the tape seized between hook 43 and stop 50, ball 56 rides in channel or groove 57 while the radius of that portion of eccentric member 58 remains substantially constant. A hump 59 at the bottom of member 58 sharply increases the radius thereof and swings arm 48 outwardly, extending finger 42 to the position shown at the bottom in FIG. 3.

In order for finger 42 to release the tape at the bottom of the feed wheel, member 58 is made eccentric in another plane, groove 57 curving inwardly as clearly shown in FIG. 4, carrying ball 56 therewith and rocking block 44 about the axis of bolt 46 to swing hook 43 away from the plane of wheel 33 to the position shown at the bottom in FIG. 4, out of the way of tape 29 so that the tape is free to fall to the ground to be deposited in the furrow formed by a furrow opening tool 60 secured to and depending from supporting frame 23.

Although the tape is deposited in a furrow and loose dirt is swept over the furrow by covering members 61, pivotally connected to the frame bars 20 and 21 and urged downwardly by a spring 62, this is frequently inadequate under certain conditions to prevent the light tape from being blown by the wind and dislodged. To assure the tape being firmly held in the ground applicant has provided staking means comprising a plunger 63 parallel to the plane of the body of wheel 33 and slidable in a sleeve 64 secured to the wheel. A cotter pin 65 carried by plunger 63 engages sleeve 64 and limits the radially inward movement thereof, while the plunger is biased inwardly by the provision of a coil spring 66 surrounding the plunger and engaging sleeve 64 at one end and at its other end a collar 67 held in place by a cotter pin 68.

In the position of parts shown at the upper left in FIG. 3, with clamping member 41 fully retracted, plunger 63 is also fully retracted by spring 66. As the wheel revolves ball 56 engages hump 59, extending finger 42 while the composite cam or eccentric member 58 also swings the finger 42 away from tape 29. The projection 53 on arm 48 engages the inner end of plunger 63, the latter being received in a depression 69 provided in the projection 53 and ejects the plunger outwardly against the action of spring 66. As viewed at the bottom in FIGS. 3 and 4, the laterally bent arm 70 of plunger 63 strikes the tape sharply as it leaves the wheel and stakes it or pushes it into the ground.

The tape or ribbon 29 may be deposited continuously or it may be severed by cutting means carried on the eccentric member 58 and indicated at 71. This tape severing means comprises a cutting blade 72 at the lower end of a spindle 73 rotatably mounted in a flange 74 of a bracket 75 secured to member 58 by bolts 76.

In the operating position for cutting, the blade 72 is positioned between the inner surface of rim 39 of the feed wheel and hook 43 resting against stop 50 as the loop of tape passes across the knife. When the tape is to be cut into sections the knife is held in the operating position shown and is biased to a disengaged position for planting continuous tape by the provision of a coil spring 77 anchored at one end to bracket 75 and at the other end to an arm 78 affixed to spindle 73 and having an opening 79 therein by which a cable or the like, not shown, may be attached to arm 71 permitting the operator of the vehicle which propels the implement to turn spindle 73 against the bias of the spring 77 to an operative position of the knife.

As the feed wheel continues to revolve and clamping member 41 moves upwardly, finger 42 remains extended and swung away from the disk portion of the wheel, and staking plunger 63 continues to be extended outwardly until the effective radius of member 58 declines and the outer section of channel 57 swings block 44 inwardly to a position for finger 42 to again engage and grasp the tape 29.

It should be clear that the member 58 is a compound eccentric or cam which not only reciprocates clamping member 41 radially of the feed wheel but which also locks the clamping finger 42 toward and away from the main body of the wheel.

It is believed that the operation of the planting apparatus of this invention will be clearly understood from the foregoing description. It should likewise be understood that the invention has been described in its preferred embodiment and that modifications may be made therein without departing from the spirit of the invention or the scope of the appended claims.

What is claimed is:

1. In a machine for planting continuous seed tape and the like including a frame, a furrow opener and a source of continuous tape mounted on the frame, a feed wheel rotatably mounted on the frame having a main body and a rim upon which the tape is trained for deposit in the furrow formed by the furrow opener during rotation of the wheel, a staking device mounted on the main body of the wheel for reciprocating movement in a plane parallel thereto and radially thereof, said rim having an opening therein to accommodate projection of the staking device therethrough into engagement with the tape on the rim, means mounted on the frame operatively responsive to rotation of said feed wheel to reciprocate said staking device radially of the feed wheel from a retracted position interiorly of said rim when the staking device is at the top of the path of rotation of the wheel to an extended position exteriorly of the rim at the bottom of said path adjacent the ground to strike the tape and press it into the ground.

2. The invention set forth in claim 1, wherein the means mounted on the frame for reciprocating the staking device is a cam mounted on the frame adjacent the wheel and operatively engageable with said staking device.

3. In a planter for seed tape and the like including a mobile frame, a ground-engaging wheel rotatably mounted on the frame and a supply of tape carried by the frame from which a strip of tape is fed to the wheel to be trained thereover and deposited on the ground during rotation thereof, the combination of releasable holding means carried by the wheel, said holding means grasping the tape as it feeds onto the wheel and holding the tape against the wheel as the wheel rotates through a partial revolution, actuating means mounted on said frame, said holding means being actuated by said actuating means to release said tape adjacent the ground after said wheel rotates through said partial revolution, a reciprocating device mounted on the wheel periodically engaging the tape and projecting it beyond the wheel after the tape is released by said holding means, said reciprocating device being reciprocated outwardly of said wheel through actuation of said holding means by said actuating means whereby said tape is pressed into the ground, and means to retract said device for subsequent engagement with another portion of the tape.

4. The invention set forth in claim 3 wherein said actuating means is a single operating member mounted on the frame.

References Cited in the file of this patent

UNITED STATES PATENTS

| | | |
|---|---|---|
| 1,292,082 | Sanford | Jan. 21, 1919 |
| 1,784,376 | Moore | Dec. 9, 1930 |